May 22, 1962

A. WESTALL ET AL 3,035,402

TEXTILE SPINNING SPINDLES

Filed Aug. 27, 1959

2 Sheets-Sheet 1

Inventors
Arthur Westall
and Alan Smith
By Moses, Nolte & Nolte
Attorneys

United States Patent Office 3,035,402
Patented May 22, 1962

3,035,402
TEXTILE SPINNING SPINDLES
Arthur Westall, Burnley, and Alan Smith, Accrington, England, assignors to T.M.M. (Research) Limited, Lancashire, England, a company of Great Britain
Filed Aug. 27, 1959, Ser. No. 836,442
Claims priority, application Great Britain Sept. 5, 1958
7 Claims. (Cl. 57—135)

The object of this invention is to provide an improved form of mounting for the spindles of a textile spinning or like machine, such spindles being of the type wherein the spindle blade, which carries a driving wharve, is revolvably mounted in a bolster by means of spaced journal and footstep bearings, with capability of a controlled degree of lateral and oscillatory movement therein permitting the blade to accommodate itself to vibrations set up by the out-of-balance load during critical speed phases encountered in acceleration to and deceleration from the maximum or operating speed.

In a spindle mounting of said type, according to the invention, the journal bearing is mounted within the bolster by resilient members located at axially spaced positions which are respectively wholly above and wholly below the bearing. Said mounting may include a case within which the journal bearing is carried.

Figure 1:
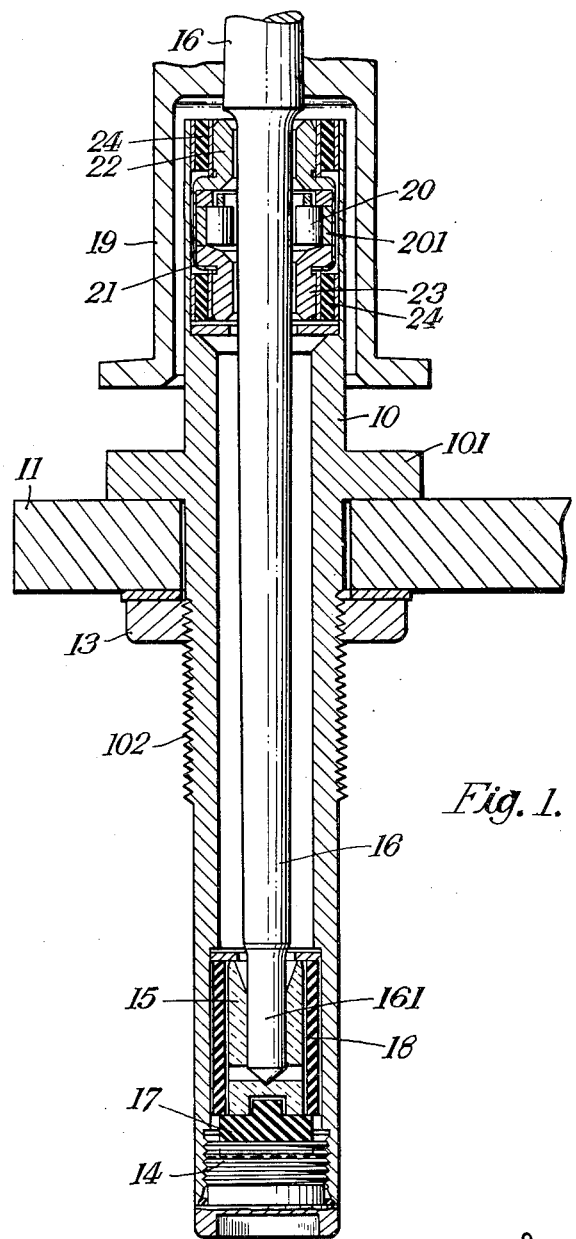
Figure 2:
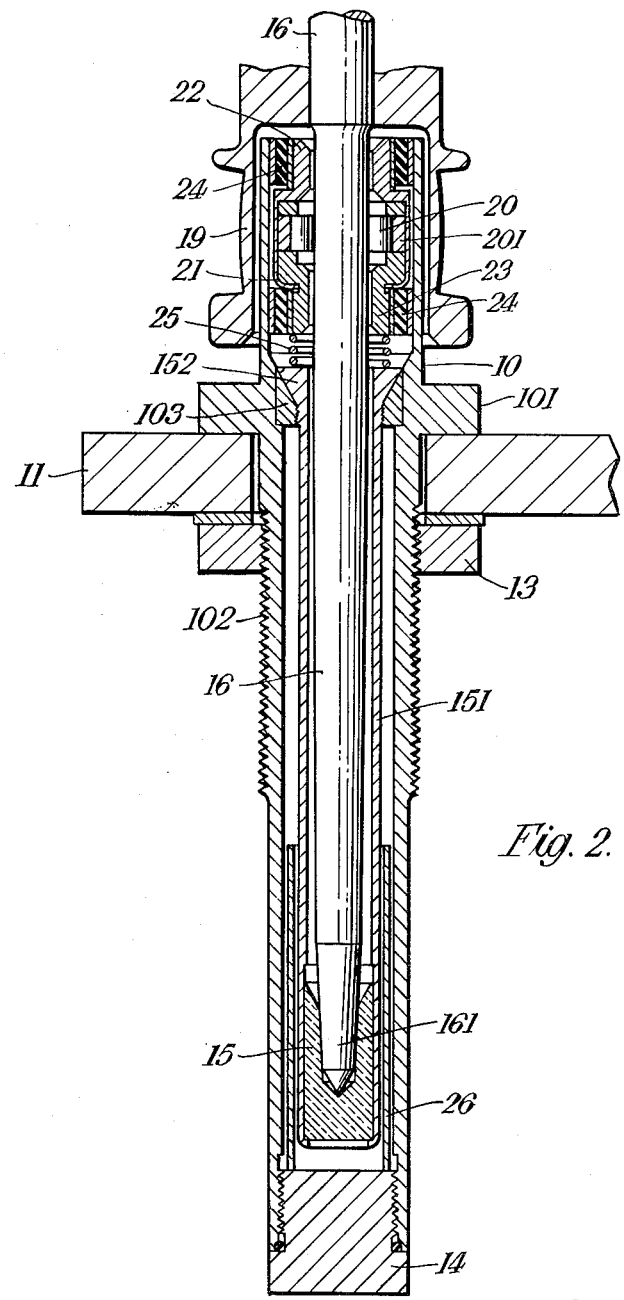

The manner in which the invention may be carried into effect is hereinafter described with reference to the accompanying drawing, of which FIG. 1 is a sectional elevation of a preferred form of spindle mounting in accordance with the invention, and FIG. 2 is a similar view of a modification of the invention.

It will be seen that the mounting incorporates a bolster of generally conventional form, comprising a cylindrical tube 10 shouldered or flanged at 101 to seat upon the spindle rail or the like 11, and having an external screw-thread 102 by which it is clamped upon the underside of the rail 11 by means of a nut 13. The base of the bolster tube 10 is closed by a removable screw-plug 14, the inner face of which provides a flat support for a footstep bearing 15 in which the lower tip 161 of the spindle blade 16 is received; a pad 17 of rubber or other resilient material is interposed between the surfaces of the footstep bearing 15 and said plug 14, and a bush 18 of the same material encloses the lateral wall of the bearing, substantially filling the space between the latter and the inner wall of the bolster 10 and thereby serving to check any tendency of the footstep bearing 15 towards independent rotation or oscillation. It is preferred that the bush 18 should have a fairly free fit so that there is a small clearance on both its inner and outer diameters.

At an intermediate point in its length, conveniently adjacent the position of the driving wharve 19, the spindle blade 16 passes through a roller bearing 20. The outer race 201 of said bearing is enclosed by a metal case 21, which is made intergral with or is attached to spacer sleeves 22, 23 which form extensions of the bearing unit above and below the bearing 20. The outer diameter of said axial extensions is less than the outer diameter of the outer race 201, and the outer diameter of the casing 21 surrounding the roller bearing 20 is smaller than the intrenal diameter of the bolster 10 at this position. The said sleeves 22, 23, are of less diameter than the bearing outer race 201 and between each of said sleeves and the inner wall of the bolster 10, there is fitted a resilient bush 24 which may be of the "Silentbloc" type.

The wall of the bolster 10 is reduced in thickness to accommodate the journal bearing and the elements of the resilient mounting as aforedescribed, and the arrangement is such that the center of the bearing is located substantially at the level of the mid-point of the wharve 19.

Such an arrangement, in which the duties of providing lateral support for the journal bearing 20 are shared by two independent resilient units 24 respectively spaced above and below the bearing, is found to afford an effective control over both radial and pivotal movements of the spindle blade 16 in this region, due to the duplicated control imposed at axially spaced positions. An equivalent degree of pivotal control could only be achieved by a single resilient bush, were it made at least as long as the axial distance between the two resilient bushes of the present device, but it will be understood that such an arrangement would suffer the disadvantage that it would necessitate a considerably larger overall diameter of the assembly at the journal bearing, necessitating a larger wharve, and the arrangement would also impose a more severe restriction on the radial movement of the bearing.

It will be understood that other constructional arrangements of the footsteps bearing may be used in lieu of the one hereinbefore described and illustrated in the drawing. For example in an alternative embodiment shown in FIG. 2, the bearing member 15 is carried in a sleeve 151 which extends into the upper part of the bolster 10 where it is formed with an inverted frusto-conical enlargement or shoulder 152 which rests in a conformably shaped nylon washer 103 secured in the bore of the bolster. A spring 25 is provided to ensure that the said shoulder 152 seats correctly upon said washer 103. Said sleeve 151 may be surrounded at the foot in a steel outer sleeve 26 so as to damp in known manner lateral movements of the footstep 15 permitted by the conical mounting 152 of the upper end of the inner sleeve 151.

What we claim as our invention and desire to secure by Letters Patent is:

1. A mounting for the spindles of a textile spinning or like machine, wherein the spindle blade is revolvably mounted in a bolster by spaced journal and footstep bearings, characterized in that the journal bearing is carried within a case which is mounted for lateral movement in the bolster by resilient members, said journal bearing having an outer race, said outer race being enclosed by a metal case having a sleeve-like axial extension whereof the outer diameter of said extension is less than the outer diameter of said bearing outer race, said resilient members being mounted in the bolster at axially spaced positions above and below the journal bearing and between said axial extension and said bolster.

2. A mounting as claimed in accordance with claim 1 wherein the wall of the bolster is reduced in thickness to accommodate the journal bearing and the members composing the resilient mounting thereof, the arrangement being such that the center of the journal bearing is located substantially at the level of the mid-point of a wharve on the spindle blade.

3. A mounting as claimed in accordance with claim 1, wherein the lower tip of the spindle blade is carried by a footstep bearing resting upon a plug in the base of the bolster.

4. A mounting as claimed in claim 3, wherein a resilient pad is interposed between the adjacent faces of the footstep bearing and the plug.

5. A mounting as claimed in claim 1, wherein the footstep bearing is carried in a sleeve which extends into the upper part of the bolster where it is supported in such manner as to permit lateral movement of the footstep bearing in the base of the bolster.

6. A mounting as claimed in claim 5 wherein the upper end of the sleeve has an inverted frusto-conical shoulder which seats in a conformably shaped seating member fixed in the bolster.

7. A mounting as claimed in claim 5, including means within the bolster for damping said lateral movements therein.

References Cited in the file of this patent

UNITED STATES PATENTS

| | | |
|---|---|---|
| 410,974 | Jacquith | Sept. 10, 1889 |
| 412,996 | Taft et al. | Oct. 15, 1889 |
| 2,092,291 | Olsen | Sept. 7, 1937 |
| 2,127,921 | Kent | Aug. 23, 1938 |
| 2,350,272 | Cobb | May 30, 1944 |
| 2,588,636 | Korsgren | Mar. 11, 1952 |
| 2,699,033 | Bell | Jan. 11, 1955 |
| 2,704,946 | Gray et al. | Mar. 29, 1955 |
| 2,863,278 | Scragg | Dec. 9, 1958 |
| 2,969,262 | Staufert | Jan. 24, 1961 |

FOREIGN PATENTS

| | | |
|---|---|---|
| 1,099,680 | France | Mar. 23, 1955 |
| 1,126,532 | France | July 30, 1956 |